US011620860B2

(12) United States Patent
Ebihara

(10) Patent No.: US 11,620,860 B2
(45) Date of Patent: *Apr. 4, 2023

(54) SPOOFING DETECTION APPARATUS, SPOOFING DETECTION METHOD, AND COMPUTER-READABLE RECORDING MEDIUM

(71) Applicant: NEC Corporation, Tokyo (JP)

(72) Inventor: Akinori Ebihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,012

(22) Filed: Dec. 7, 2021

(65) Prior Publication Data

US 2022/0092323 A1 Mar. 24, 2022

Related U.S. Application Data

(63) Continuation of application No. 16/971,460, filed as application No. PCT/JP2018/006562 on Feb. 22, 2018, now Pat. No. 11,222,221.

(51) Int. Cl.
*G06V 40/40* (2022.01)
*G06V 40/16* (2022.01)
*G06V 40/18* (2022.01)

(52) U.S. Cl.
CPC ............ *G06V 40/40* (2022.01); *G06V 40/162* (2022.01); *G06V 40/165* (2022.01); *G06V 40/197* (2022.01)

(58) Field of Classification Search
CPC .... G06V 40/40; G06V 40/162; G06V 40/165; G06V 40/197; G06V 10/141;
(Continued)

(56) References Cited

U.S. PATENT DOCUMENTS

| 11,222,221 B2* | 1/2022 | Ebihara | G06V 10/60 |
| 2004/0005083 A1 | 1/2004 | Fujimura | A61B 3/113 |
| | | | 382/103 |

(Continued)

FOREIGN PATENT DOCUMENTS

| JP | 2006-099614 A | 4/2006 |
| JP | 2007-241402 A | 9/2007 |

(Continued)

OTHER PUBLICATIONS

International Search Report for PCT Application No. PCTIJP2018/006562, dated May 22, 2018.

(Continued)

*Primary Examiner* — Nimesh Patel
(74) *Attorney, Agent, or Firm* — Sughrue Mion, PLLC

(57) ABSTRACT

A spoofing detection apparatus 300 includes a face image obtaining unit 301 that obtains a first image frame that includes the face of a subject person obtained with a light-emitting apparatus 320 turned on and a second image frame that includes the face of the subject person obtained with a light-emitting apparatus 320 turned off, a face information extraction unit 302 that extracts first face information, and extracts second face information, a feature value calculation unit 303 that obtains a luminance value of the face portion in the first image frame, obtains a luminance value of the face portion in the second image frame, and calculates, based on these values, a feature value that reflects a three-dimensional shape, and that is independent of colors of a face surface, and a spoofing determination unit 304 that determines authenticity of subject person based on the feature value.

9 Claims, 10 Drawing Sheets

(58) Field of Classification Search
CPC .... G06V 10/60; G06V 40/161; G06V 40/193; G06V 20/20; G06V 40/172; G06V 40/20; G06V 40/10; G06V 10/955; G06V 40/168; G06V 40/45; G06V 40/28; G06V 20/52; G06V 40/174; G06V 10/82; G06V 10/20; G06V 40/15; G06V 40/70; G06V 10/7715; G06V 40/1388; G06V 40/1382; G06V 20/46; G06V 40/1347; G06V 40/1365; G06V 40/16; G06V 10/255; G06V 40/23; G06T 1/00; G06T 7/00; G06T 2207/10016; G06T 7/0012; G06T 2207/30201; G06T 2207/10012; G06T 7/73; G06T 5/002; G06T 2200/04; G06T 2207/10028; G06T 17/00; G06T 7/74; G06T 7/337; G06T 5/00; G06T 1/0071; G06T 19/20; G06T 19/003; G06T 2207/20221; G06T 7/50; G06T 2207/30196; G06T 7/0014; G06T 7/0002; G06T 3/4038; G06T 7/11; G06T 7/55; G06T 2207/10048; G06T 2207/20081; G06T 2207/30004; G06T 2207/10004; G06T 7/246; G06T 2207/30232; G06T 7/20; G06T 7/33; G06T 1/0021; G06T 15/205; G06T 7/593; G06T 1/0007; G06T 2207/20084; G06T 7/70; G06T 7/80; G06F 16/9535; G06F 3/04845; G06F 21/32; G06F 3/005; G06F 17/40; G06F 3/0425; G06F 16/00; G06F 21/64; G06F 16/78; G06F 3/038; G06F 21/88; G06F 21/6227; G06F 3/015; G06F 21/6245; G06F 1/3206; G06F 1/13338; G06F 1/133504; G06F 1/133606; G06F 1/133607; G06F 1/1335; G06F 16/95; G06F 21/31; G06F 21/445; G06F 21/552; G06F 21/577; G06F 21/6218; G06F 2221/2101; G06F 2221/2115; G06F 2221/2119; G01S 7/415; G01S 15/06; G01S 13/66; G01S 13/56; G01S 13/867; G01S 13/865; G01S 13/86; G01S 19/42; H04L 63/1483; H04L 63/1491; G06K 9/00046; G06K 9/0004; G06K 9/00906; G06K 2209/01; G06K 9/00087; G06K 9/00107; G06K 9/0012; G06K 9/2036; G06K 9/209; G06K 9/22; G06K 9/46; G02B 6/00; G02B 6/0051; G02B 6/0055; G02B 6/0076

See application file for complete search history.

(56) References Cited

U.S. PATENT DOCUMENTS

| | | | |
|---|---|---|---|
| 2006/0102843 A1 | 5/2006 | Bazakos | G06K 9/00255 250/339.05 |
| 2008/0267600 A1 | 10/2008 | Omi | G06K 9/00255 396/14 |
| 2012/0027292 A1 | 2/2012 | Kozakaya et al. | |
| 2015/0160725 A1 | 6/2015 | Lee | A61B 3/113 348/78 |
| 2015/0324629 A1 | 11/2015 | Kim et al. | |
| 2016/0117544 A1 | 4/2016 | Hoyos | G06K 9/00604 348/78 |
| 2016/0379050 A1 | 12/2016 | Tian | |
| 2017/0186170 A1 | 6/2017 | Nugraha | G06T 7/586 |
| 2020/0156648 A1 | 5/2020 | Zhang | G06K 9/00255 |
| 2021/0034893 A1 | 2/2021 | Ebihara | G06K 9/0061 |

FOREIGN PATENT DOCUMENTS

| | | |
|---|---|---|
| JP | 2007-280367 A | 10/2007 |
| JP | 2009-187130 A | 6/2009 |
| JP | 2010-231398 A | 10/2010 |
| JP | 4609253 B2 | 1/2011 |
| JP | 2015-215876 A | 12/2015 |
| JP | 2017-016192 A | 1/2017 |
| JP | 2017-191374 A | 10/2017 |

OTHER PUBLICATIONS

English translation of Written opinion for PCT Application No. PCT/JP2018/006562, dated May 22, 2018.
JP Office Action for JP Application No. 2021-189807, dated Dec. 6, 2022 with English Translation.

* cited by examiner

SPOOFING DETECTION APPARATUS, SPOOFING DETECTION METHOD, AND COMPUTER-READABLE RECORDING MEDIUM

CROSS-REFERENCE TO RELATED APPLICATIONS

The present application is a continuation application of U.S. patent application Ser. No. 16/971,460 filed on Aug. 20, 2020, which is a National Stage Entry of international application PCT/JP2018/006562, filed Feb. 22, 2018, the disclosures of all of which are incorporated in their entirety by reference herein.

TECHNICAL FIELD

The present invention relates to a spoofing detection apparatus and a spoofing detection method for performing spoofing detection during face authentication, and also to a computer-readable recording medium, in which a program for realizing the apparatus and method is recorded.

BACKGROUND ART

Log-in systems that use a biometric authentication technique such as face authentication have the advantage of being unburdened by storing and managing a password, unlike log-in systems that use a password.

However, in a log-in system that uses a biometric authentication technique, even if an authorized person properly uses the system, there is the possibility that an authentication error will occur, unlike log-in systems that use a password. Furthermore, in a log-in system that uses a biometric authentication technique, there is the possibility that a third party will be recognized as an authorized person by mistake, and there is the possibility that, when a malicious third party attempts authentication using an image or a moving image of the authorized person, the image will be authenticated.

Therefore, in log-in systems that use a biometric authentication technique, from the viewpoint of security, such impersonated (spoofing) log-in by a third party that is not an authorized person has been a serious problem, and there has been increasing demand for detection techniques for preventing spoofing.

Particularly, if face authentication is used in login for an application program on a mobile terminal, it is generally more difficult to take measures against spoofing since types of hardware that are mounted in a mobile terminal are limited. Examples of a technique that is used in a spoofing detection system for face authentication include a technique that uses a special sensor such as an infrared camera, a technique for performing shooting in different directions using a plurality of cameras, and a technique for measuring the depth of a face using focus switching.

However, currently, mobile terminals are not usually equipped with hardware required for using these techniques. Examples of types of hardware mounted in a large number of mobile terminals, from among types of hardware that can be used for spoofing detection during face authentication, include an sub-camera directed to the user side and a light-emitting apparatus (flash) provided in association with the sub-camera. Therefore, techniques for performing spoofing detection using these have been proposed (for example, see Patent Documents 1 and 2).

Both Patent Documents 1 and 2 disclose a spoofing detection apparatus that emits light onto the surface of a face, and determines, using the light reflected by the face, whether or not the face is the face of a real human. Specifically, the spoofing detection apparatus disclosed in Patent Document 1 performs spoofing detection using characteristics of diffuse reflection that an incident angle of light that is incident onto a surface is different between a three-dimensional face of a real human and a two-dimensional face in a photograph or a moving image, and that reflected light observed from a specific position is different between a three-dimensional face of a real human and a two-dimensional face in a photograph or a moving image.

In addition, the spoofing detection apparatus disclosed in Patent Document 2 first detects a plurality of feature points of a face included in image data, applies the detected feature points to a three-dimensional model prepared in advance, and normalizes the face included in the image data. The positional relation between the feature points and the respective feature points on the three-dimensional model is obtained through the normalization. Thus, the spoofing detection apparatus disclosed in Patent Document 2 estimates the illumination direction of light based on a pattern obtained through the normalization, and performs spoofing detection based on the estimation result.

LIST OF PRIOR ART DOCUMENTS

Patent Document

Patent Document 1: Japanese Patent Application No. 2015-215876
Patent Document 1: Japanese Patent Application No. 2010-231398

SUMMARY OF INVENTION

Problems to be Solved by the Invention

Incidentally, when light is emitted onto the surface of the face of a subject person, the light is diffusely reflected by the surface of the face except for the exceptional surfaces of eyeballs, eye glasses, and the like. Therefore, in the spoofing detection apparatuses disclosed in Patent Documents 1 and 2 above, the three-dimensional shape of the face of a subject person is measured based on this reflected light.

However, techniques that use such diffuse reflection involve a problem of dependence on color. The problem of dependence on color is a problem in that a result of diffuse reflection differs depending on color even between objects that have the same three-dimensional shape. A detailed description will be given below in this regard.

First, diffuse reflection is generally dependent on the color of the surface of an object. Lambert's model, which is a model of diffuse reflection, assumes that an observed luminance value L is a function of a light source component I, a reflection coefficient K, and an angular component θ of a surface as expressed in Expression 1 below.

$$L(\lambda) = IK(\lambda) \cos \theta \qquad (1)$$

Since K is a function of a light wavelength λ in Expression 1, the observed luminance value L is also a function of the wavelength λ. Accordingly, it can be said that the luminance value L is an observed value that is dependent on a light wavelength, in other words, color.

Therefore, the spoofing detection apparatuses disclosed in Patent Documents 1 and 2 perform spoofing detection based on light diffusively reflected by an object surface, and thus, Lambert's model that is similar to that in Expression 1 can be applied to these spoofing detection apparatuses. That is to say, it is conceivable that the problem of dependence on color occurs in the above-described spoofing detection apparatuses disclosed in Patent Documents 1 and 2.

An example object of the invention is to provide a spoofing detection apparatus, a spoofing detection method, and a computer-readable recording medium that dissolve the above problem, and enable execution of spoofing detection without being affected by dependence on color during face authentication.

Means for Solving the Problems

In order to achieve the above-described example object, a spoofing detection apparatus according to an example aspect of the invention includes:

a face image obtaining unit configured to obtain, from an image capture apparatus, a first image frame that includes a face of a subject person when light was emitted from a light-emitting apparatus associated with the image capture apparatus and a second image frame that includes the face of the subject person when the light-emitting apparatus was turned off;

a face information extraction unit configured to extract information specifying a face portion of the subject person as first face information, from the first image frame, and extract information specifying a face portion of the subject person as second face information, from the second image frame;

a feature value calculation unit configured to obtain a luminance value of the face portion in the first image frame using the first face information, obtain a luminance value of the face portion in the second image frame using the second face information, and calculate, based on the obtained luminance values, a feature value that reflects a three-dimensional shape of the face of the subject person, and that is independent of colors of a surface of the face of the subject person; and a spoofing determination unit configured to determine authenticity of the subject person captured by the image capture apparatus, based on the feature value.

In addition, in order to achieve the above-described example object, a spoofing detection method according to an example aspect of the invention includes:

(a) a step of obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;

(b) a step of extracting information specifying a face portion of the subject person as first face information, from the first image frame, and extracting information specifying a face portion of the subject person as second face information, from the second image frame;

(c) a step of obtaining a luminance value of the face portion in the first image frame using the first face information, obtaining a luminance value of the face portion in the second image frame using the second face information, and calculating, based on the obtained luminance values, a feature value that reflects a three-dimensional shape of the face of the subject person, and that is independent of colors of a surface of the face of the subject person; and (d) a step of determining authenticity of the subject person captured by the image capture apparatus, based on the feature value.

Furthermore, in order to achieve the above-described example object, a computer-readable recording medium according to an example aspect of the invention that includes a program recorded thereon, the program including instructions that cause a computer to carry out:

(a) a step of obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;

(b) a step of extracting information specifying a face portion of the subject person as first face information, from the first image frame, and extracting information specifying a face portion of the subject person as second face information, from the second image frame;

(c) a step of obtaining a luminance value of the face portion in the first image frame using the first face information, obtaining a luminance value of the face portion in the second image frame using the second face information, and calculating, based on the obtained luminance values, a feature value that reflects a three-dimensional shape of the face of the subject person, and that is independent of colors of a surface of the face of the subject person; and (d) a step of determining authenticity of the subject person captured by the image capture apparatus, based on the feature value.

Advantageous Effects of the Invention

As described above, according to the invention, during face authentication, spoofing detection can be executed without being affected by dependence on color.

MODE FOR CARRYING OUT THE INVENTION (Summary of Invention)

First, before describing example embodiments of the invention, summary of the invention will be described. As described above, diffuse reflection on the surface of a face is dependent on the colors of the surface of the face. Therefore, in Patent Documents 1 and 2 described in BACKGROUND ART, there is the possibility that, even regarding a face that has the same three-dimensional shape, a spoofing detection result will change depending on color by being affected by the colors of the surface of the face. In contrast, the invention copes with this problem by calculating a feature value that is independent of color, based on an image of a subject person shot when a flash was on and an image of the subject person shot when the flash was off.

Figure 1:
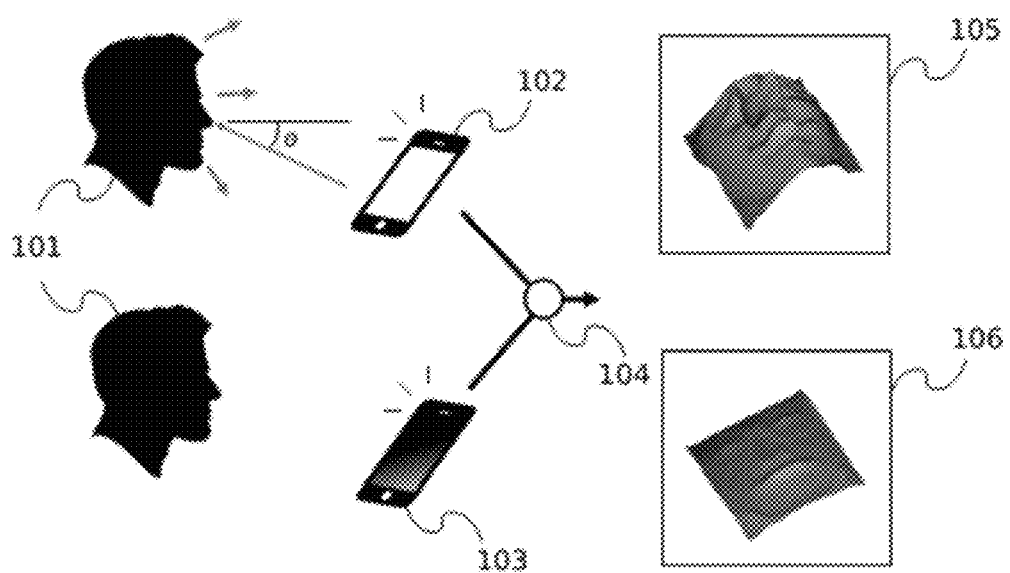
FIG. 1 is a diagram showing an example of a technique for calculating a feature value using diffuse reflection in a face region according to the invention.
Figure 2:
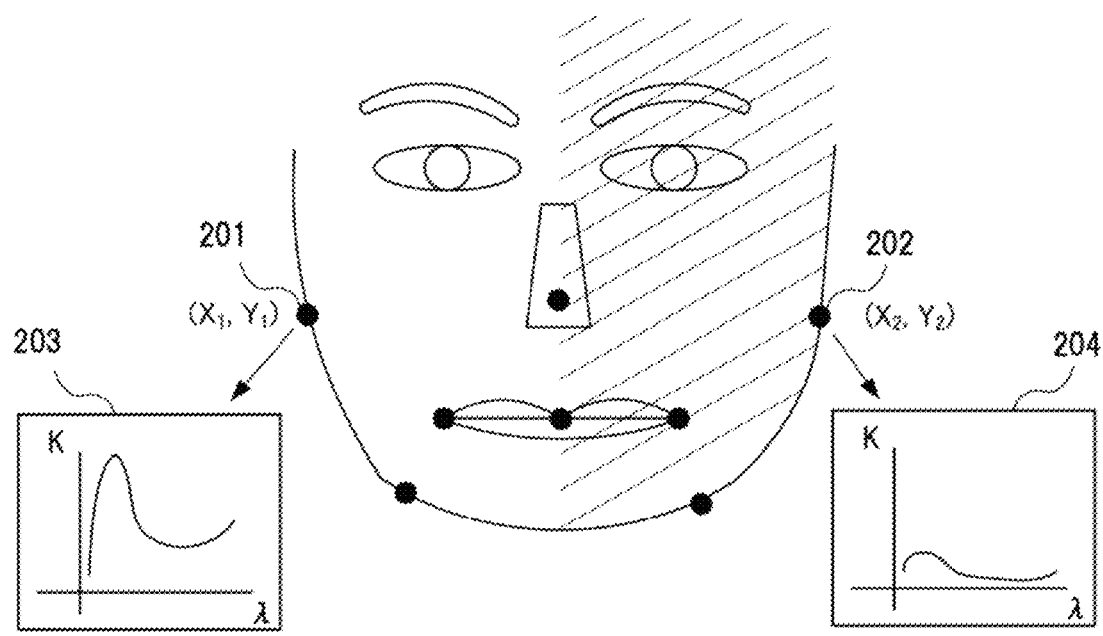
FIG. 2 is an explanatory diagram explaining a change in a feature value due to dependence on color.

Here, a method for calculating a feature value for which the dependence on color is dissolved, based on an image shot when a flash was on and an image shot when the flash was off, according to the invention will be described in comparison to a conventional method for calculating a feature value, with reference to FIGS. 1 and 2. FIG. 1 is a diagram showing an example of a technique for calculating a feature value using diffuse reflection on a face region, according to the invention. FIG. 2 is an explanatory diagram explaining a change in a feature value due to dependence on color.

First, as shown in FIG. 1, a user 101 shoots their own face at least once using a terminal apparatus 102 equipped with a camera when the flash is on, and also shoots their own face at least once using a terminal apparatus 103 equipped with a camera when the flash is off. According to the invention, a feature value in a face region is calculated based on two types of image frames obtained through respective instances of shooting. In FIG. 1, reference numeral 104 indicates a graphic that abstractly indicates a process of calculating a feature value.

As a result of calculation, a feature value 105 or a feature value 106 shown on the right side of FIG. 1 is obtained. If a three-dimensional shape as the feature value 105 appears, it is determined that the captured face is a real face. On the other hand, if a two-dimensional shape as the feature value 106 appears, it is determined that the captured face is a fake face shown in a photograph or on a display.

However, as described above, color-dependent reflection occurs in a face region as indicated in Expression 1. As shown in FIG. 2, for example, assume that there are a point 201 and a point 202 on a face at which inclinations are similar, the inclinations being one of the characteristics that define a three-dimensional shape. At this time, if the colors at the point 201 and the point 202 are different due to a shadow or the like that covers the face, the reflection coefficient K that is dependent on the wavelength λ, differs as indicated in a graph 203 and a graph 204. In this case, as a result, in the above-described spoofing detection apparatuses disclosed in Patent Documents 1 and 2, the value of a feature value differs depending on a face portion, and there is the possibility that this will pose an obstacle to accurate spoofing determination.

According to the invention, in order to cope with such problem of dependence on color, a feature value that is independent of the reflection coefficient K is calculated based on an image frame shot when the flash was on and an image frame shot when the flash was off. As a result, according to the invention, it is possible to accurately perform spoofing detection that is robust against change in the colors of the surface of the face of a subject person.

Example embodiments of the invention will be described below. Note that the following description and drawings are omitted and simplified as appropriate for clarification. In addition, in the drawings, the same reference signs are assigned to the same constituent elements, and redundant description is omitted as necessary. In addition, specific numerical values and the like mentioned in the example embodiments are merely exemplary for ease of understanding of the invention, and there is no limitation thereto.

First Example Embodiment

A spoofing detection apparatus, a spoofing detection method, and a program according to a first example embodiment of the invention will be described below with reference to FIGS. 3 to 5 below.

[Apparatus Configuration]

First, the configuration of the spoofing detection apparatus according to the first example embodiment will be described with reference to FIG. 3. FIG. 3 is a block diagram showing the configuration of the spoofing detection apparatus according to the first example embodiment of the invention.

Figure 3:
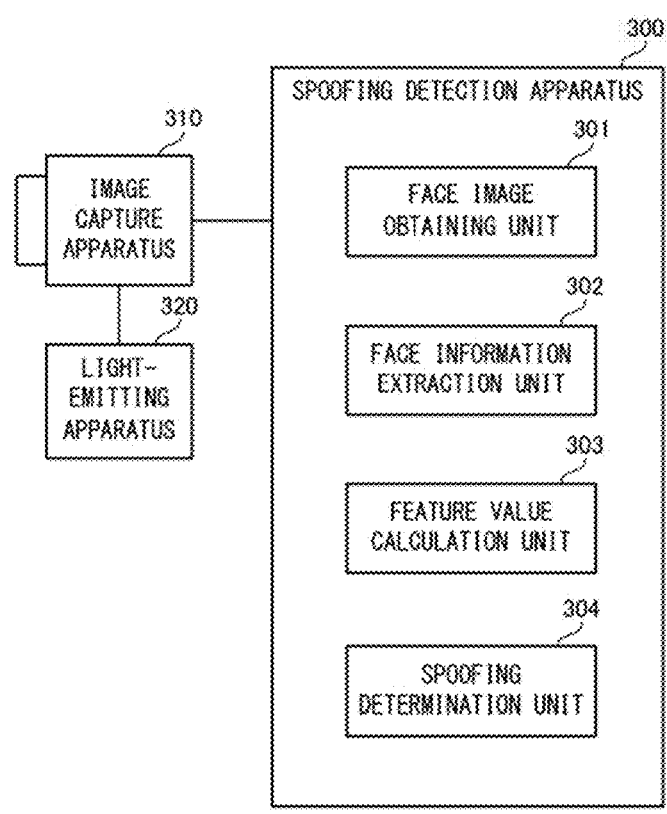
FIG. 3 is a functional block diagram showing an example of a configuration of functional blocks of a spoofing detection apparatus according to a first example embodiment.
Figure 4:
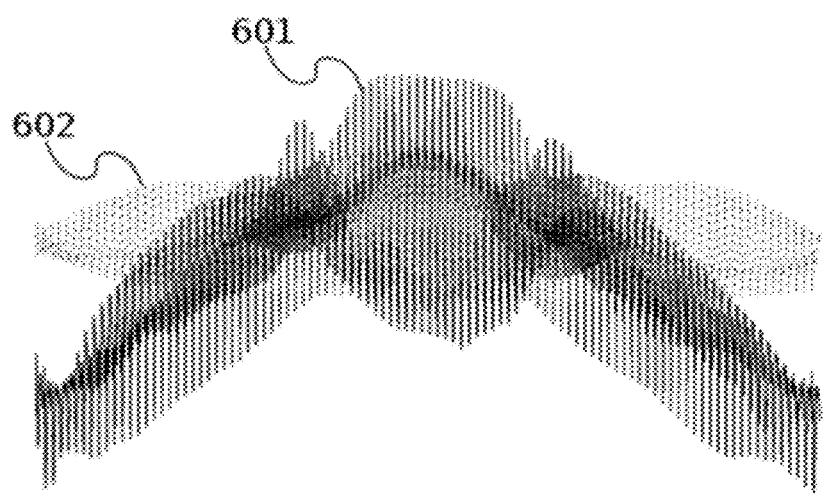
FIG. 4 is a diagram showing an example of feature values calculated according to an example embodiment of the invention.

A spoofing detection apparatus 300 according to the first example embodiment shown in FIG. 3 is an apparatus for performing spoofing detection during face authentication. As shown in FIG. 1, the spoofing detection apparatus 300 includes a face image obtaining unit 301, a face information extraction unit 302, a feature value calculation unit 303, and a spoofing determination unit 304.

The face image obtaining unit 301 obtains, from an image capture apparatus 310, a first image frame that includes the face of a subject person when light was emitted by a light-emitting apparatus 320 accompanying the image capture apparatus 310 and a second image frame that includes the face of the subject person when the light-emitting apparatus 320 was turned off.

The face information extraction unit 302 extracts, from the first image frame, information specifying a face portion of the subject person as first face information. The face information extraction unit 302 also extracts, from the second image frame, information specifying a face portion of the subject person as second face information.

The feature value calculation unit 303 first obtains the luminance value of the face portion in the first image frame using the first face information, and obtains the luminance value of the face portion in the second image frame using the second face information. The feature value calculation unit 303 then calculates, based on the obtained luminance values, a feature value that reflects the three-dimensional shape of the face of the subject person, and is independent of the colors of the surface of the face of the subject person.

The spoofing determination unit 304 determines the authenticity of the subject person captured by the image capture apparatus 310, based on the feature value calculated by the feature value calculation unit 303. Specifically, the spoofing determination unit 304 determines whether or not the captured subject person is a real human.

As described above, according to the first example embodiment, the spoofing detection apparatus 300 can calculate a feature value that is independent of the colors of the surface of the face of a subject person, unlike the conventional spoofing detection apparatuses described in BACK-GROUND ART (see FIG. 2 described above). Therefore, according to the first example embodiment, it is possible to perform spoofing detection without being affected by dependence on color, during face authentication.

Subsequently, the configuration of the spoofing detection apparatus 300 according to the first example embodiment will be described in more detail. First, as shown in FIG. 3, according to the first example embodiment, the spoofing detection apparatus 300 is connected to the image capture apparatus 310 equipped with the light-emitting apparatus 320. Examples of the image capture apparatus 310 include a digital camera and a digital video camera.

As described above, the face image obtaining unit 301 obtains a first image frame shot when the light-emitting apparatus was emitting light and a second image frame shot when the light-emitting apparatus was turned off. In addition, the first image frame and the second image frame that are obtained at this time may be image frames of still images, or may also be image frames of moving images.

According to the first example embodiment, the face information extraction unit 302 first detects the region of a face portion of the subject person (hereinafter, referred to as a "face region") from each of the first image frame and the second image frame. Specifically, the face information extraction unit 302 detects a face region, for example, using a Haar-like feature value. A method for detecting a face region using a Haar-like feature value is disclosed in Reference Document 1 below, for example.

Reference Document 1

P. Viola and M. Jones, "Rapid Object Detection Using a Boosted Cascade of Simple Features," Proceedings of the 2001 IEEE Computer Society Conference on Computer Vision and Pattern Recognition (CVPR), Vol. 1, 2001, pp. 511-518.

Subsequently, the face information extraction unit 302 extracts first face information from the face region extracted from the first image frame, and extracts second face information from the face region extracted from the second image frame. Specifically, the face information extraction unit 302 estimates the regions of the parts of the face based on each of the face regions, and uses information specifying the positions of the estimated regions of the parts as face information.

The face information extraction unit 302 can define a face region, using the distance between the eyes, by a rectangular whose center is the same as the center of the face, whose horizontal width is twice the distance between the eyes, and whose vertical height is three times the distance between the eyes, for example, and this definition is set as face information. In addition, the distance between eyes is calculated by detecting the eyes from an image frame. For example, a ring Gabor filter can be used for detecting eyes. Detection of a face region using a ring Gabor filter is disclosed in Reference Document 2 below, for example.

Reference Document 2

Zhang, Y., Sun, N., Gao, Y, and Cao, M. (2008). A new eye location method based on Ring Gabor Filter. In Automation and Logistics, 2008. ICAL 2008. IEEE International Conference On, (IEEE), pp. 301-305.

According to the first example embodiment, the feature value calculation unit 303 calculates a feature value based on diffuse reflection on the face of a subject person. In a face region of a human, light from the light-emitting apparatus 320 is diffusely reflected due to the three-dimensional (uneven) shape of the face. Therefore, if a feature value that reflects the three-dimensional shape of the face is calculated based on the pattern of this diffuse reflection, it is possible to perform determination between a real three-dimensional face and a face in a two-dimensional photograph or a face on a display screen.

Here, the method for calculating a feature value according to the first example embodiment will be described in more detail. First, as indicated by Lambert's model, which is a model of diffuse reflection (see Expression 1 in PROBLEMS TO BE SOLVED BY THE INVENTION), a luminance value L is considered as a function of a light source component I, a reflection coefficient K, and an angular component θ of a surface.

Also, since the reflection coefficient K is a function of the light wavelength λ as indicated in Expression 1 above, the observed luminance value L is also a function of the light wavelength λ. Thus, it can be said that the luminance value L is an observed value that is dependent on the light wavelength λ, in other words, the color of light. However, if a feature value changes depending on the color of the surface of the face, spoofing detection cannot be accurately performed. In view of this, according to the first example embodiment, a feature value that is independent of the reflection coefficient K is calculated using an image when the light-emitting apparatus 320 is emitting light and an image when the light-emitting apparatus 320 is turned off. Specifically, a feature value is calculated as follows.

A luminance value $L_{in}$ of each pixel of the first image frame shot when the light-emitting apparatus 320 was emitting light and a luminance value $L_{out}$ of each pixel of the second image frame shot when the light-emitting apparatus 32 was turned off can be respectively expressed as Expressions 2 and 3 below.

$$L_{in}(\lambda, x, y) = I_c K(\lambda, x, y) \cos \theta_c + I_b K(\lambda, x, y) \cos \theta_b \quad (2)$$

$$L_{out}(\lambda, x, y) = I_b K(\lambda, x, y) \cos \theta_b \quad (3)$$

Here, similar to Expression 1 above, I is a light source component, K is a reflection coefficient that is dependent on color, and θ is an angular component of a surface. In addition, $I_c$ and $I_b$ respectively indicate the intensity of light of the flash of a camera and the intensity of background light (ambient light). x and y indicate a position of a pixel in an image frame. $\theta_c$ and $\theta_b$ respectively indicate an incident angle of camera light and an incident angle of background light. Obtaining a feature value that is independent of the color of the surface of a face region, and that reflects the three-dimensional shape of the face is the same as obtaining a feature value that is independent of K. In view of this, Expression 4 below is introduced as a feature value for which the ratio of the luminance value $L_{in}$ to the luminance value $L_{out}$ for each pixel is used.

$$\frac{L_{in} - L_{out}}{L_{in} + L_{out}} = \frac{I_c K(\lambda, x, y) \cos \theta_c}{I_c K(\lambda, x, y) \cos \theta_c + 2 I_b K(\lambda, x, y) \cos \theta_b} = \frac{I_c \cos \theta_c}{I_c \cos \theta_c + 2 I_b \cos \theta_b} \quad (4)$$

It can be said that the feature value shown in Expression 4 is a feature value that is independent of the reflection coefficient K, and for which the dependence on color is dissolved. Therefore, the feature value calculation unit 303 calculates a feature value using Expression 4 above. In addition, FIG. 4 is a diagram showing an example of feature values calculated according to an example embodiment of the invention. In the example in FIG. 4, reference numeral 601 denotes a feature value calculated based on a real face, and reference numeral 602 denotes a feature value calculated based on a fake face (a face in a photograph or a face displayed on a screen of a display device).

According to the first example embodiment, the spoofing determination unit 304 determines the authenticity of a subject person, that is to say whether or not the subject person is a real human, by applying a feature value calculated by the feature value calculation unit 303 to a classifier created in advance.

Specifically, examples of the classifier include an SVM binary classifier constructed using an SVM (Support Vector Machine). In addition, this classifier is constructed by preparing, in advance, a feature value calculated based on an image of a real human face and a feature value calculated based on an image of a fake human face, and performing training using these feature values. Note that a method for constructing a classifier using a Support Vector Machine is disclosed in Reference Document 3 below.

Reference Document 3

V. Vapnik and A. Lerner. Pattern recognition using generalized portrait method. Automation and Remote Control, 24, 1963.

[Apparatus Operations]

Next, operations of the spoofing detection apparatus 300 according to the first example embodiment of the invention will be described with reference to FIG. 5. FIG. 5 is a flowchart showing operations of the spoofing detection apparatus according to the first example embodiment of the invention. In the following description, FIGS. 3 and 4 will be referred to as appropriate. In addition, according to the first example embodiment, the spoofing detection method is carried out as a result of causing the spoofing detection apparatus 300 to operate. Thus, a description of the spoofing detection method according to the first example embodiment is replaced with the following description of operations of the spoofing detection apparatus 300.

Figure 5:
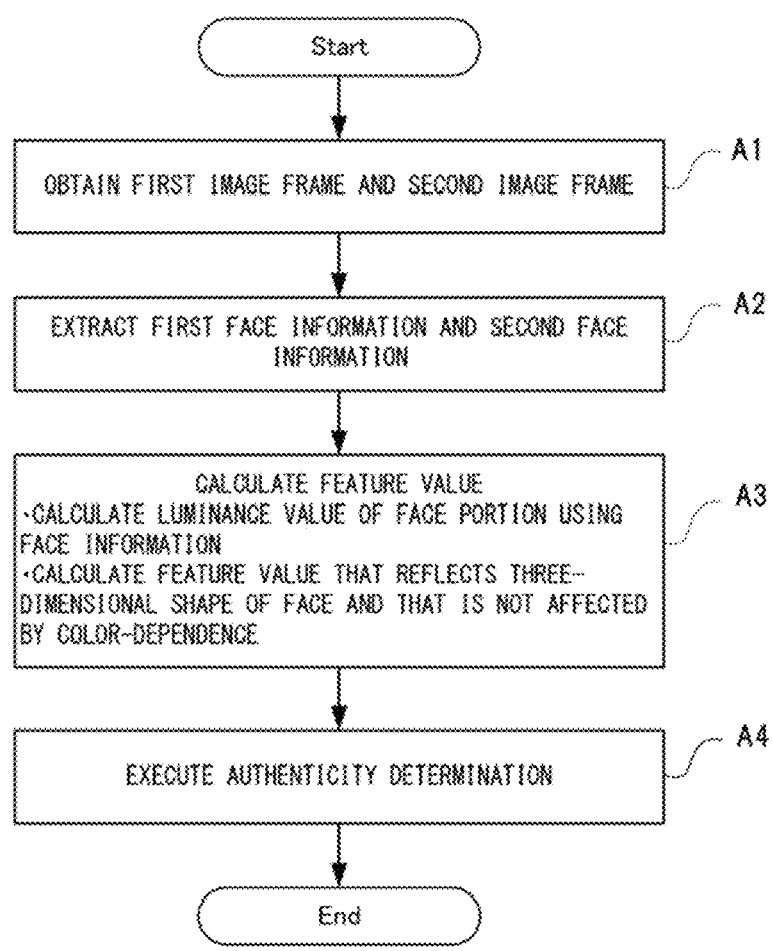
FIG. 5 is a flowchart showing operations of the spoofing detection apparatus according to the first example embodiment of the invention.

As shown in FIG. 5, first, the face image obtaining unit 301 obtains, from the image capture apparatus 310, a first image frame that includes the face of a subject person when light was emitted from the light-emitting apparatus 320 associated with the image capture apparatus 310 and a second image frame that includes the face of the subject person when the light-emitting apparatus 320 was turned off (step A1).

Next, the face information extraction unit 302 extracts, from the first image frame, information specifying a face portion of the subject person as first face information, and also extracts, from the second image frame, information specifying a face portion of the subject person as second face information (step A2).

Next, the feature value calculation unit 303 first obtains a luminance value of the face portion in the first image frame using the first face information, and obtains a luminance value of the face portion in the second image frame using the second face information. The feature value calculation unit 303 then calculates, based on the obtained luminance values, a feature value that reflects the three-dimensional shape of the face of the subject person and is independent of the colors of the surface of the face of subject person (step A3).

Specifically, in step A3, the feature value calculation unit 303 obtains the luminance value $L_{in}$ of each pixel of the face portion of the first image frame, from the first face information, and the luminance value $L_{out}$ of each pixel of the face portion of the second image frame, from the second face information, and applies the obtained luminance values to Expression 4 above, and calculates a feature value.

The spoofing determination unit 304 then determines the authenticity of the subject person captured by the image capture apparatus 310, based on the feature value calculated by the feature value calculation unit 303 in step A3 (step A4). Specifically, the spoofing determination unit 304 determines whether or not the captured subject person is a real human.

After executing step A4, the spoofing detection apparatus notifies the determination result to an apparatus that uses a detection result. If the detection result indicates a real human, the apparatus that has received the notification continues authentication processing, and, if the detection result does not indicate a real human, the apparatus stops authentication processing.

[Effect of First Example Embodiment]

As described above, according to the first example embodiment, the spoofing detection apparatus 300 calculates a feature value that is independent of the colors of the surface of the face of a subject person, and can perform determination of whether or not spoofing has occurred, based on this feature value. Therefore, according to the first example embodiment, it is possible to perform more accurate authenticity determination that is independent of color during face authentication.

[Program]

The program according to the first example embodiment may be a program for causing a computer to execute steps A1 to A4 shown in FIG. 5. The spoofing detection apparatus 300 and the spoofing detection method according to the first example embodiment can be realized as a result of installing this program to a computer, and executing this program. In this case, the processor of the computer functions as the face image obtaining unit 301, the face information extraction unit 302, the feature value calculation unit 303, and the spoofing determination unit 304, and performs processing.

In addition, the program according to the first example embodiment may also be executed by a computer system constituted by a plurality of computers. In this case, for example, each of the computers may also function as one of the face image obtaining unit 301, the face information extraction unit 302, the feature value calculation unit 303, and the spoofing determination unit 304.

Second Example Embodiment

Next, a spoofing detection apparatus, a spoofing detection method, and a program according to a second example embodiment of the invention will be described with reference to FIGS. 6 and 7.

[Apparatus Configuration]

First, the configuration of the spoofing detection apparatus according to the second example embodiment will be described with reference to FIG. 6. FIG. 6 is a block diagram showing the configuration of the spoofing detection apparatus according to the second example embodiment of the invention.

Figure 6:
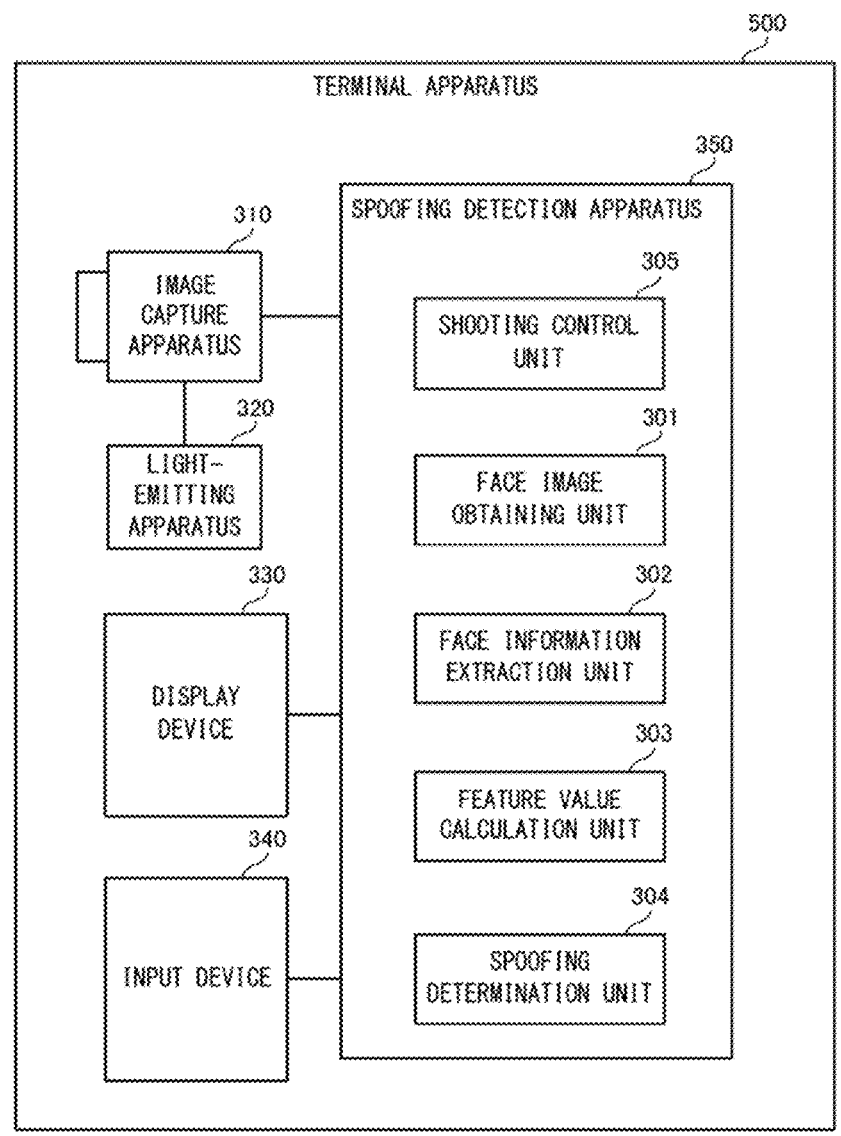
FIG. 6 is a block diagram showing the configuration of a spoofing detection apparatus according to a second example embodiment of the invention.

As shown in FIG. 6, a spoofing detection apparatus 350 according to the second example embodiment is constituted by a mobile terminal apparatus 500. Specifically, the spoofing detection apparatus 350 is constituted by a program that operates on the operating system of the terminal apparatus 500. In addition, the terminal apparatus 500 includes the image capture apparatus 310, the light-emitting apparatus 320, a display device 330, and an input device 340.

As shown in FIG. 6, also according to the second example embodiment, the spoofing detection apparatus 350 includes the face image obtaining unit 301, the face information extraction unit 302, the feature value calculation unit 303, and the spoofing determination unit 304, similarly to the spoofing detection apparatus 300 according to the first example embodiment shown in FIG. 3. Functions of these are the same as those described in the first example embodiment.

Note that, according to the second example embodiment, the spoofing detection apparatus 350 further includes a shooting control unit 305, unlike the first example embodiment. The shooting control unit 305 controls shooting that is performed by the image capture apparatus 310 and on/off of the light-emitting apparatus 320, and sets a light-emitting period of the light-emitting apparatus 320 and a shooting timing of the image capture apparatus 310.

Specifically, the shooting control unit 305 instructs the light-emitting apparatus 320 to emit light, and then instruct the image capture apparatus 310 to perform shooting for 150 milliseconds. Thereafter, the shooting control unit 305 instructs the light-emitting apparatus 320 to turn off, and then instructs the image capture apparatus 310 to perform shooting for 150 milliseconds.

[Apparatus Operations]

Next, operations of the spoofing detection apparatus 350 according to the second example embodiment of the invention will be described with reference to FIG. 7. FIG. 7 is a flowchart showing operations of the spoofing detection apparatus according to the second example embodiment of the invention. In the following description, FIG. 6 will be referred to as appropriate. In addition, according to the second example embodiment, the spoofing detection method is carried out as a result of causing the spoofing detection apparatus 350 to operate. Thus, a description of the spoofing detection method according to the second example embodiment is replaced with the following description of operations of the spoofing detection apparatus 350.

Figure 7:
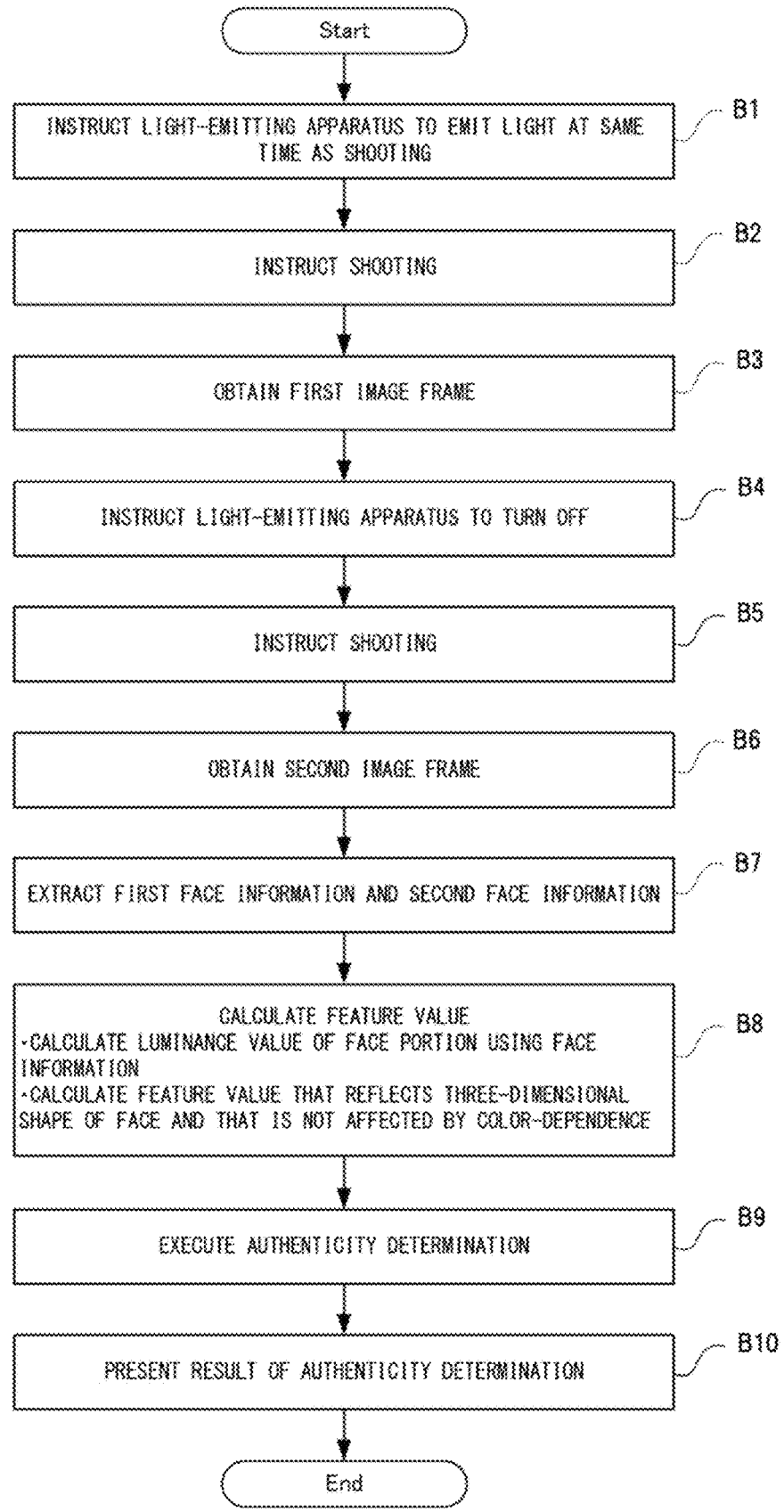
FIG. 7 is a flowchart showing operations of the spoofing detection apparatus according to the second example embodiment of the invention.

Note that, in the example in FIG. 7, an image of the face of a subject person when light is emitted and an image when light is not emitted are shot. In addition, a light-emitting period of the light-emitting apparatus 320 is 300 milliseconds, and one image is shot in 150 milliseconds after light emission is started, and another image is shot in 150 milliseconds after the light is turned off.

As shown in FIG. 7, first, when the terminal apparatus 500 is instructed to perform authentication, the shooting control unit 305 instructs the light-emitting apparatus 320 to emit light at the same time as shooting (step B1), and also instructs the image capture apparatus 310 to perform shooting (step B2).

When step B2 is executed, shooting is performed by the image capture apparatus 310, and image data is output, and thus the face image obtaining unit 301 obtains the output image data as a first image frame (step B3).

Next, after step B3 is executed, the shooting control unit 305 instructs the light-emitting apparatus 320 to turn off (step B4), and also instructs the image capture apparatus 310 to perform shooting (step B5).

When step B5 is executed, shooting is performed by the image capture apparatus 310, and image data is output, and thus the face image obtaining unit 301 obtains the output image data as a second image frame (step B6).

Next, the face information extraction unit 302 extracts information specifying a face portion of the subject person as first face information, from the first image frame obtained in step B3, and also extracts information specifying a face portion of the subject person as second face information, from the second image frame obtained in step B6 (step B7).

The feature value calculation unit 303 first obtains the luminance value of the face portion in the first image frame using the first face information, and obtains the luminance value of the face portion in the second image frame using the second face information. The feature value calculation unit 303 then calculates, based on the obtained luminance values, a feature value that reflects the three-dimensional shape of the face of the subject person, and is independent of the colors of the surface of the face of the subject person (step B8).

Next, the spoofing determination unit 304 determines the authenticity of the subject person captured by the image capture apparatus 310, based on the feature value calculated by the feature value calculation unit 303 in step B8 (step B9). Specifically, the spoofing determination unit 304 determine whether or not the captured subject person is a real human. Note that steps B7 to B9 are similar to the corresponding steps A2 to A4 shown in FIG. 5.

Thereafter, the spoofing determination unit 304 presents the result of the determination performed in step B9 (detection result), on a screen using the display device 330 of the terminal apparatus 500 (step B10). Accordingly, the user of the terminal apparatus 500 can confirm the detection result. In addition, if the detection result indicates a real human, the terminal apparatus 500 continues authentication processing, and if the detection result does not indicate a real human, the terminal apparatus 500 stops authentication processing.

As described above, also in the second example embodiment, similarly to the first example embodiment, the spoofing detection apparatus 350 can calculate a feature value that is independent of the color of the surface of the face of a subject person, and determine whether or not spoofing has occurred, based on this feature value. Therefore, also according to the second example embodiment, it is possible to more accurately perform spoofing detection that is independent of colors during face authentication.

[Program]

The program according to the second example embodiment may be a program for causing a computer to execute steps B1 to B10 shown in FIG. 7. The spoofing detection apparatus 350 and the spoofing detection method according to the second example embodiment can be realized as a result of installing this program to a computer, and executing this program. In this case, the processor of the computer functions as the face image obtaining unit 301, the face information extraction unit 302, the feature value calculation unit 303, the spoofing determination unit 304, and the shooting control unit 305, and performs processing.

In addition, the program according to the second example embodiment may also be executed by a computer system constituted by a plurality of computers. In this case, for example, each of the computers may also function as one of the face image obtaining unit 301, the face information extraction unit 302, the feature value calculation unit 303, the spoofing determination unit 304, and the shooting control unit 305.

Third Example Embodiment

Next, a spoofing detection apparatus, a spoofing detection method, and a program according to a third example embodiment of the invention will be described with reference to FIGS. 8 to 10.

[Apparatus Configuration]

First, the configuration of the spoofing detection apparatus according to the third example embodiment will be described. In this third example embodiment, the configuration of the spoofing detection apparatus is similar to the configuration of the spoofing detection apparatus 350 according to the second example embodiment shown in FIG. 6. Therefore, in the third example embodiment, FIG. 6 will be referred to.

However, the spoofing detection apparatus according to the third example embodiment is different from the spoofing detection apparatus 350 according to the second example embodiment, in the functions of the feature value calculation unit 303 and the spoofing determination unit 304. The differences will be mainly described below.

According to the third example embodiment, more accurate spoofing detection is achieved. For this reason, the feature value calculation unit 303 calculates a second feature value, in addition to a feature value that reflects the three-dimensional shape of the face of a subject person and is independent of the colors of the surface of the face of the subject person (hereinafter, referred to as a "first feature value") described in the first and second example embodiments, and integrates these feature values.

According to the third example embodiment, the second feature value is a feature value that is obtained based on a bright point formed by reflection in an iris region of an eye of a subject person. In a case of a real human's face, light from the light-emitting apparatus 320 is specularly reflected in the iris region of an eye, and, as a result, appears as a bright point in an image, but the same phenomenon does not occur in a face in a photograph or an image on a display, and thus the detection accuracy is improved by using the second feature value.

Specifically, the feature value calculation unit 303 extracts, from the first image frame, a portion that includes a bright point formed by reflection in an iris region of an eye of the subject person, based on the first face information. The feature value calculation unit 303 also extracts, from the second image frame, a portion corresponding to the above portion that includes the bright point, based on the second face information. The feature value calculation unit 303 then calculates, based on the two extracted portions, a second feature value.

According to the third example embodiment, the face information extraction unit 302 estimates an iris region of an eye, and extracts face information that includes information specifying the position of the estimated iris region. In addition, examples of a method for estimating an iris region include a method for first detecting eye regions, calculating the distance between the eyes, next, using this distance between the eyes to set a square whose center is the same as the center of each of the eyes, and each side of which is one sixth of the distance between the eyes, and defining the region of this square as an iris region. In addition, examples of a method for detecting an eye region include a method that uses the above-described ring Gabor filter, which is disclosed in Reference Document 2.

Here, a technique for calculating a second feature value will be described in more detail. The feature value calculation unit 303 first extracts an iris region in the first image frame (hereinafter, referred to as a "first iris region"), using the first face information, and also extracts an iris region in the second image frame (hereinafter, referred to as a "second iris region"), using the second face information.

Next, the feature value calculation unit 303 obtains a luminance value $L_{in}$ of each pixel of the first iris region and a luminance value $L_{out}$ of each pixel of the second iris region, and calculates the difference between these values ($L_{in}-L_{out}$), for each pixel, as a second feature value. In addition, the feature value calculation unit 303 can also perform standardization, scaling, or the like on the obtained second feature value ($L_{in}-L_{out}$), and transform this into a manageable form.

In addition, the feature value calculation unit 303 can also execute conversion processing for dissolving the positional dependence, on the second feature value, in order to remove the dependence on the position of a bright point from the second feature value. This is because there is the possibility that the position of a bright point formed by reflection in an iris region of an eye will change depending on the incident angle of light from the flash that enters the iris region and the orientation of the face of the subject person. In other words, this is because the position of a bright point changes depending on a change in the positional relation between the image capture apparatus 310 and the face, and even if the luminance value of the bright point is the same, the feature value changes, and, as a result, the accuracy of spoofing detection decreases.

Therefore, the feature value calculation unit 303 performs the conversion by converting the second feature value (difference ($L_{in}-L_{out}$) for each pixel) calculated based on the iris regions, which are two-dimensional planes, into a one-dimensional vector, and sorting the values of the respective pixels in ascending order or descending order. The feature value that underwent conversion in this manner is a feature value for which the positional dependence is dissolved.

[Apparatus Operations]

Next, operations of the spoofing detection apparatus according to the third example embodiment of the invention will be described with reference to FIG. 8. FIG. 8 is a flowchart showing operations of the spoofing detection apparatus according to the third example embodiment of the invention. In the following description, FIG. 6 will be referred to as appropriate. In addition, according to the third example embodiment, the spoofing detection method is carried out as a result of causing the spoofing detection apparatus to operate. Thus, a description of the spoofing detection method according to the third example embodiment is replaced with the following description of operations of the spoofing detection apparatus.

Figure 8:
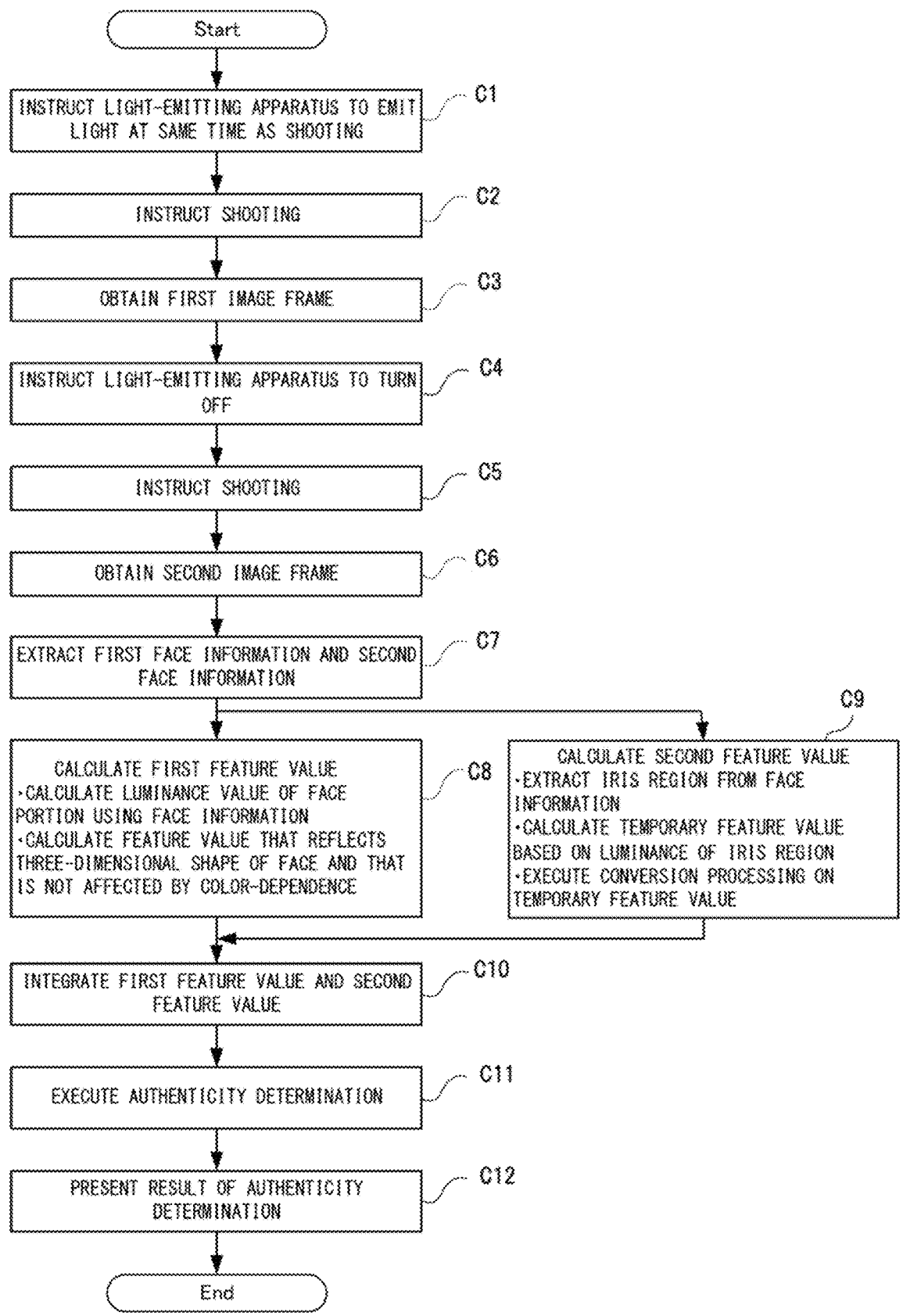
FIG. 8 is a flowchart showing operations of a spoofing detection apparatus according to a third example embodiment of the invention.

Note that, also in the example in FIG. 8, similarly to the example in FIG. 7, an image of the face of a subject person when a flash is on and an image when the flash is off are shot. In addition, the flash illumination time is 300 milliseconds, and one image is shot in 150 milliseconds after flash illumination is started, and another image is shot in 150 milliseconds after the flash is turned off.

As shown in FIG. 8, first, when the terminal apparatus 500 is instructed to perform authentication, the shooting control unit 305 instructs the light-emitting apparatus 320 to emit light at the same time as shooting (step C1), and also instructs the image capture apparatus 310 to perform shooting (step C2).

When step C2 is executed, shooting is performed by the image capture apparatus 310, and image data is output, and thus the face image obtaining unit 301 obtains the output image data as a first image frame (step C3).

Next, after step C3 is executed, the shooting control unit 305 instructs the light-emitting apparatus 320 to turn off (step C4), and also instructs the image capture apparatus 310 to perform shooting (step C5).

When step C5 is executed, shooting is performed by the image capture apparatus 310, and image data is output, and thus the face image obtaining unit 301 obtains the output image data as a second image frame (step C6).

Next, the face information extraction unit 302 extracts information specifying a face portion of the subject person as first face information, from the first image frame obtained in step C3, and also extracts information specifying a face portion of the subject person as second face information, from the second image frame obtained in step C6 (step C7).

Next, the feature value calculation unit 303 obtains the luminance value of the face portion in the first image frame using the first face information, and obtains the luminance value of the face portion in the second image frame using the second face information. The feature value calculation unit 303 then calculates, based on the obtained luminance values, a first feature value that reflects the three-dimensional shape of the face of the subject person and is independent of the colors of the surface of the face of the subject person (step C8).

The above steps C1 to C8 are similar to steps B1 to B8 according to the second example embodiment shown in FIG. 7, and similar processes are performed in these steps. However, according to the third example embodiment, step C9 is executed in parallel to or before/after step C8.

In step C9, the feature value calculation unit 303 extracts a portion that includes a bright point, from the first image frame, based on the first face information, and extracts a portion corresponding to the portion that includes the bright point, from the second image frame, based on the second face information. The feature value calculation unit 303 then calculates a second feature value based on the two extracted portions (step C9).

Figure 9:
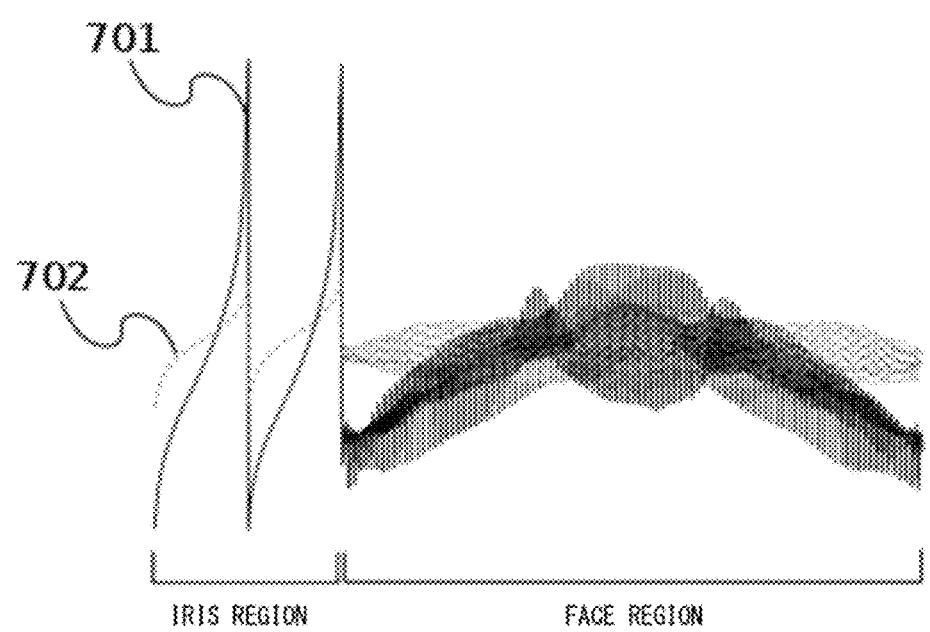
FIG. 9 is a diagram showing an example of a feature value calculated based on a face region and a feature value calculated based on an iris region according to the third example embodiment.

FIG. 9 is a diagram showing an example of a feature value calculated based on a face region and a feature value calculated based on an iris region according to the third example embodiment. As shown in FIG. 9, according to the third example embodiment, feature values calculated based on an iris region and feature values calculated based on a face region are obtained. In FIG. 9, reference numeral 701 denotes a feature value calculated based on an iris region of a real face, and reference numeral 702 denotes a feature value calculated based on an iris region of a fake face.

Next, the feature value calculation unit 303 integrates the feature value obtained in step C8 and the feature value obtained in step C9 (step C10). Specifically, the feature value calculation unit 303 converts the feature values into one-dimensional vectors, and integrates the two feature values that underwent the conversion into one vector.

Next, the spoofing determination unit 304 determines the authenticity of the subject person captured by the image capture apparatus 310, based on the feature values integrated in step C10 (step C10). Specifically, the spoofing determination unit 304 determines whether or not the captured subject person is a real human. Step C10 is similar to step B9 shown in FIG. 7.

The spoofing determination unit 304 then presents the result of the determination (detection result) in step B9, on a screen using the display device 330 of the terminal apparatus 500 (step C11). Step C11 is similar to step B10 shown in FIG. 7.

Accordingly, also according to the third example embodiment, the user of the terminal apparatus 500 can confirm the detection result. In addition, if the detection result indicates that the subject person is a real human, the terminal apparatus 500 continues authentication processing, and, if the detection result indicates that the subject person is not a real human, the terminal apparatus 500 stops authentication processing.

[Effect of Third Example Embodiment]

As described above, according to the third example embodiment, two regions where different modes of reflection occur, namely an iris region in which light from the light-emitting apparatus 320 is specularly reflected and a face region in which light from the light-emitting apparatus 320 is diffusely reflected are combined, and thereby a feature value is calculated. Authenticity is then determined based on this feature value obtained based on the combination of the regions, and thus, according to the third example embodiment, it is possible to more accurately perform authenticity classification, and to perform spoofing detection.

[Program]

The program according to the third example embodiment may be a program for causing a computer to execute steps C1 to C12 shown in FIG. 8. The spoofing detection apparatus and the spoofing detection method according to the third example embodiment can be realized as a result of installing this program to a computer, and executing this program. In this case, the processor of the computer functions as the face image obtaining unit 301, the face information extraction unit 302, the feature value calculation unit 303, the spoofing determination unit 304, and the shooting control unit 305, and performs processing.

In addition, the program according to the third example embodiment may also be executed by a computer system constituted by a plurality of computers. In this case, for example, each of the computers may also function as one of the face image obtaining unit 301, the face information extraction unit 302, the feature value calculation unit 303, the spoofing determination unit 304, and the shooting control unit 305.

(Modified Examples of Example Embodiments)

According to the above third example embodiment, the spoofing determination unit 304 can separately execute authenticity determination that is based on the feature value calculated in step C8 and authenticity determination that is based on the feature value calculated in step C9. In this case, the spoofing determination unit 304 performs determination based on the two authenticity determination results in a comprehensive manner, and conclusively determines whether or not spoofing has occurred.

Specifically, the spoofing determination unit 304 calculates a score that indicates the possibility of being authentic (true/false value) every time authenticity determination is performed, and, for example, the spoofing determination unit 304 obtains the average value of two scores, and makes a determination of true (a real human) if the average value exceeds a fixed value.

In addition, according to the above second and three example embodiments, one image of a face is shot when the light-emitting apparatus 320 is emitting light and another image of the face is shot when the light-emitting apparatus 320 is turned off, as still images, and the light-emitting period is 300 milliseconds, and shooting timings are set to 150 milliseconds from when light is emitted and 150 milliseconds after light is turned off. Note that these settings are exemplary, and may be changed. The shooting control unit 305 can change the settings in accordance with a value input to the terminal apparatus 500 by the user, for example.

In addition, in the above first to third example embodiments, shooting that is performed by the image capture apparatus 310 is performed in a state where the face of a subject person is stationary. This is because the face of the subject person needs to be extracted from an image. Therefore, during shooting, it is preferable to prompt the subject person to not move their face. Therefore, for example, before giving an instruction to perform shooting, the face image obtaining unit 301 preferably displays, on the display screen of the display device or the like, a message for prompting the subject person to not move their face.

(Physical Configuration)

Here, a computer that realizes a spoofing detection apparatus by executing the programs according to the first to third example embodiments will be described with reference to FIG. 10. FIG. 10 is a block diagram showing an example of a computer that realizes the spoofing detection apparatus according to one of the first to third example embodiments of the invention.

Figure 10:
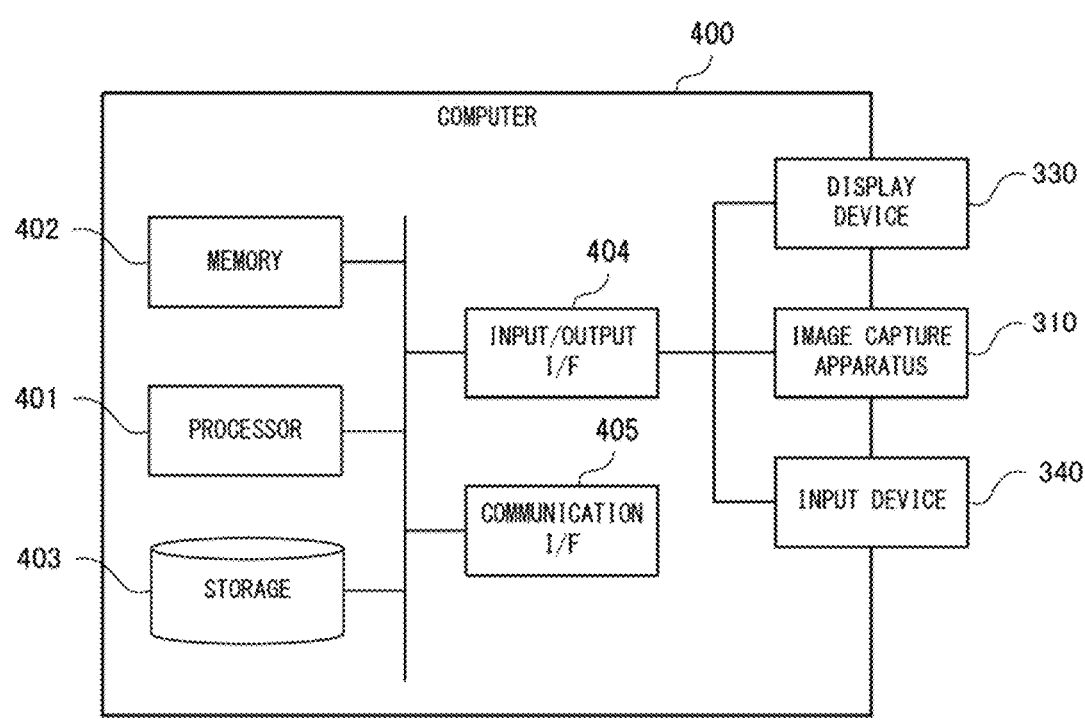
FIG. 10 is a block diagram showing an example of a computer that realizes the spoofing detection apparatuses according to the first to third example embodiments of the invention.

A computer 400 shown in FIG. 10 is, for example, a computer incorporated in a mobile terminal apparatus such as a mobile phone or a smartphone. As shown in FIG. 10, the computer 400 includes a processor 401, a memory 402, a storage 403, an input/output interface (input/output I/F) 404, and a communication interface (communication I/F) 405. The processor 401, the memory 402, the storage 403, the input/output interface 404, and the communication interface 405 are connected by a data transmission path (bus) for mutually transmitting/receiving data. Note that the hardware configuration of the computer 400 is not limited to the configuration shown in FIG. 10.

The processor 401 is a computation processing apparatus such as a CPU (Central Processing Unit) or a GPU (Graphics Processing Unit). The memory 402 is a memory such as a RAM (Random Access Memory) or a ROM (Read Only Memory). The storage 403 is a storage apparatus such as an HDD (Hard Disk Drive), an SSD (Solid State Drive), or a memory card.

The memory 402 or the storage 403 stores programs for realizing the units that constitute a spoofing detection apparatus. As a result of the processor 401 executing the programs, the units are realized, and various types of processing are executed. Here, a configuration may also be adopted in which, when executing such programs, the processor 401 reads out the programs to the memory 402 and then executes them, or executes the programs without reading out them to the memory 402.

A configuration may also be adopted in which the above-described programs are stored in one of various types of non-transitory computer-readable recording media, and are supplied to the computer 400. Examples of the non-transitory computer-readable recording medium include various types of tangible recording media.

Examples of the non-transitory computer-readable recording medium include a magnetic recording medium (such as a flexible disk, a magnetic tape, or a hard disk drive), a magnetooptical recording medium (such as a magnetooptical disk), a CD-ROM (compact disc read only memory), a CD-R (compact disc recordable), a CD-R/W (compact disc rewritable), and a semiconductor memory (such as a mask ROM, a PROM (programmable ROM), an EPROM (erasable PROM), a flash ROM, or a RAM).

In addition, the programs may also be supplied to the computer 400 from one of various types of transitory computer-readable recording media. Examples of the transitory computer-readable recording medium include an electrical signal, an optical signal, and electromagnetic waves.

The transitory computer-readable recording medium can supply programs to the computer via a wired communication path made of an electric wire, an optical fiber, or the like, or a wireless communication path.

The input/output interface 404 is connected to the image capture apparatus 310, the display device 330, the input device 340, and the like. The display device 330 is a device for displaying a screen corresponding to rendering data processed by the processor 401, such as an LCD (Liquid Crystal Display) or a CRT (Cathode Ray Tube) display. The communication interface 405 transmits/receives data to/from an external apparatus. The communication interface 405 communicates with an external apparatus via a wired network or a wireless network, for example.

The image capture apparatus 310 is an apparatus for the user to shoot the face of a subject person, etc., or a subject person to shoot their own face, etc., such as a digital camera or a digital video camera. The input device 340 is a device for receiving a user's operation input, and is a keyboard, a touch sensor, a touch panel, and the like. For example, if the input device 340 is a touch panel, the input device 340 and the display device 330 may be integrated.

Note that the spoofing detection apparatus according to the example embodiment can also be realized by using items of hardware respectively corresponding to the units, instead of a computer in which the programs are installed. Furthermore, a configuration may also be adopted in which a portion of the spoofing detection apparatus is realized by the program, and the remaining portion is realized by hardware.

The example embodiments described above can be partially or wholly realized by supplementary notes 1 to 12 described below, but the invention is not limited to the following description.

(Supplementary Note 1)

A spoofing detection apparatus comprising:

a face image obtaining unit configured to obtain, from an image capture apparatus, a first image frame that includes a face of a subject person when light was emitted from a light-emitting apparatus associated with the image capture apparatus and a second image frame that includes the face of the subject person when the light-emitting apparatus was turned off;

a face information extraction unit configured to extract information specifying a face portion of the subject person as first face information, from the first image frame, and extract information specifying a face portion of the subject person as second face information, from the second image frame;

a feature value calculation unit configured to obtain a luminance value of the face portion in the first image frame using the first face information, obtain a luminance value of the face portion in the second image frame using the second face information, and calculate, based on the obtained luminance values, a feature value that reflects a three-dimensional shape of the face of the subject person, and that is independent of colors of a surface of the face of the subject person; and a spoofing determination unit configured to determine authenticity of the subject person captured by the image capture apparatus, based on the feature value.

(Supplementary Note 2)

The spoofing detection apparatus according to Supplementary Note 1, further comprising:

a shooting control unit configured to set a light-emitting period of the light-emitting apparatus and a shooting timing of the image capture apparatus.

(Supplementary Note 3)

The spoofing detection apparatus according to Supplementary Note 1 or 2, wherein the feature value calculation unit further extracts a portion that includes a bright point formed by reflection in an iris region of an eye of the subject person, from the first image frame based on the first face information, further extracts a portion corresponding to the portion that includes the bright point, from the second image frame based on the second face information, and calculates, based on the two extracted portions, a second feature value, and the spoofing determination unit determines authenticity of the subject person captured by the image capture apparatus, based on the second feature value and the feature value that reflects the three-dimensional shape of the face of the subject person, and that is independent of the colors of the surface of the face of the subject person.

(Supplementary Note 4)

The spoofing detection apparatus according to Supplementary Note 3, wherein the spoofing determination unit separately executes authenticity determination that is based on the feature value that reflects the three-dimensional shape of the face of the subject person, and that is independent of the colors of the surface of the face of the subject person and authenticity determination that is based on the second feature value, calculates a score that indicates a possibility of being authentic every time authenticity determination is performed, and executes conclusive authenticity determination based on scores calculated in the respective instances of authenticity determination.

(Supplementary Note 5)

A spoofing detection method comprising:

(a) a step of obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;

(b) a step of extracting information specifying a face portion of the subject person as first face information, from the first image frame, and extracting information specifying a face portion of the subject person as second face information, from the second image frame;

(c) a step of obtaining a luminance value of the face portion in the first image frame using the first face information, obtaining a luminance value of the face portion in the second image frame using the second face information, and calculating, based on the obtained luminance values, a feature value that reflects a three-dimensional shape of the face of the subject person, and that is independent of colors of a surface of the face of the subject person; and (d) a step of determining authenticity of the subject person captured by the image capture apparatus, based on the feature value.

(Supplementary Note 6)

The spoofing detection method according to Supplementary Note 5, further comprising:

(e) a step of setting a light-emitting period of the light-emitting apparatus and a shooting timing of the image capture apparatus.

(Supplementary Note 7)

The spoofing detection method according to Supplementary Note 5 or 6, wherein, in the (c) step, a portion that includes a bright point formed by reflection in an iris region of an eye of the subject person is further extracted from the first image frame based on the first face information, a portion corresponding to the portion that includes the bright point is further extracted from the second image frame based on the second face information, and a second feature value is calculated based on the two extracted portions, and in the (d) step, authenticity of the subject person captured by the image capture apparatus is determined based on the second feature value and the feature value that reflects the three-dimensional shape of the face of the subject person, and that is independent of the colors of the surface of the face of the subject person.

(Supplementary Note 8)

The spoofing detection method according to Supplementary Note 7, wherein, in the (d) step, authenticity determination that is based on the feature value that reflects the three-dimensional shape of the face of the subject person, and that is independent of the colors of the surface of the face of the subject person and authenticity determination that is based on the second feature value are separately executed, a score that indicates a possibility of being authentic is calculated every time authenticity determination is performed, and conclusive authenticity determination is executed based on scores calculated in the respective instances of authenticity determination.

(Supplementary Note 9)

A computer-readable recording medium that includes a program recorded thereon, the program including instructions that cause a computer to carry out:

(a) a step of obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;

(b) a step of extracting information specifying a face portion of the subject person as first face information, from the first image frame, and extracting information specifying a face portion of the subject person as second face information, from the second image frame;

(c) a step of obtaining a luminance value of the face portion in the first image frame using the first face information, obtaining a luminance value of the face portion in the second image frame using the second face information, and calculating, based on the obtained luminance values, a feature value that reflects a three-dimensional shape of the face of the subject person, and that is independent of colors of a surface of the face of the subject person; and (d) a step of determining authenticity of the subject person captured by the image capture apparatus, based on the feature value.

(Supplementary Note 10)

The computer-readable recording medium according to Supplementary Note 9, the program further including an instruction that causes a computer to carry out:

(e) a step of setting a light-emitting period of the light-emitting apparatus and a shooting timing of the image capture apparatus.

(Supplementary Note 11)

The computer-readable recording medium according to Supplementary Note 9 or 10, wherein, in the (c) step, a portion that includes a bright point formed by reflection in an iris region of an eye of the subject person is further extracted from the first image frame based on the first face information, a portion corresponding to the portion that includes the bright point is further extracted from the second image frame based on the second face information, and a second feature value is calculated based on the two extracted portions, and in the (d) step, authenticity of the subject person captured by the image capture apparatus is determined based on the second feature value and the feature value that reflects the three-dimensional shape of the face of the subject person, and that is independent of the colors of the surface of the face of the subject person.

(Supplementary Note 12)

The computer-readable recording medium according to Supplementary Note 11, wherein, in the (d) step, authenticity determination that is based on the feature value that reflects the three-dimensional shape of the face of the subject person, and that is independent of the colors of the surface of the face of the subject person and authenticity determination that is based on the second feature value are separately executed, a score that indicates a possibility of being authentic is calculated every time authenticity determination is performed, and conclusive authenticity determination is executed based on scores calculated in the respective instances of authenticity determination.

Although the present invention has been described above with reference to the example embodiments above, the invention is not limited to the above example embodiments. Various modifications understandable to a person skilled in the art can be made in configurations and details of the invention, within the scope of the invention.

INDUSTRIAL APPLICABILITY

As described above, according to the invention, during face authentication, spoofing detection can be executed without being affected by dependence on color. The invention is useful for various systems in which face authentication is performed.

LIST OF REFERENCE SIGNS

101 User
102 Terminal apparatus equipped with camera when flash is on
103 Terminal apparatus equipped with camera when flash is off
104 Process of calculating feature value
105 Feature value calculated based on real face
106 Feature value calculated based on fake face
201 Point on face with certain inclination (x1, y1)
202 Point on face with certain inclination (x2, y2)
203 Graph indicating reflection coefficient K on point (x1, y1)
204 Graph indicating reflection coefficient K on point (x2, y2)
300 Spoofing detection apparatus (first example embodiment)
301 Face image obtaining unit
302 Face information extraction unit
303 Feature value calculation unit
304 Spoofing determination unit
305 Shooting control unit
310 Image capture apparatus
320 Light-emitting apparatus
330 Display device
340 Input device
350 Spoofing detection apparatus (second example embodiment)
400 Computer
401 Processor
402 Memory
403 Storage
404 Input/output interface (Input/output I/F)
500 Terminal apparatus
701 Feature vector calculated based on real face
702 Feature vector calculated based on fake face
901 Feature vector calculated based on real face region/iris region
902 Feature vector calculated based on fake face region/iris region

The invention claimed is:

1. A spoofing detection apparatus comprising:
a memory storing a program; and
one or more processors configured to run the program to execute:
obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;
extracting information specifying a face portion of the subject person as first face information, from the first image frame, and extract information specifying a face portion of the subject person as second face information, from the second image frame;
obtaining a luminance value of the face portion in the first image frame using the first face information, obtain a luminance value of the face portion in the second image frame using the second face information, and calculating, based on the obtained luminance values, a feature value that reflects a three-dimensional shape of the face of the subject person, and that is independent of colors of a surface of the face of the subject person;
determining authenticity of the subject person captured by the image capture apparatus, based on the feature value;
extracting a portion that includes a bright point formed by reflection in an iris region of an eye of the subject person, from the first image frame based on the first face information, further extracting a portion corresponding to the portion that includes the bright point, from the second image frame based on the second face information, and calculating, based on the two extracted portions, a second feature value; and
determining authenticity of the subject person captured by the image capture apparatus, based on the second feature value and the feature value that reflects the three-dimensional shape of the face of the subject person, and that is independent of the colors of the surface of the face of the subject person.

2. The spoofing detection apparatus according to claim 1, further
the processor configured to run the program to execute:
setting a light-emitting period of the light-emitting apparatus and a shooting timing of the image capture apparatus.

3. The spoofing detection apparatus according to claim 1
wherein the processor configured to run the program to execute:
separately executing authenticity determination that is based on the feature value that reflects the three-dimensional shape of the face of the subject person, and that is independent of the colors of the surface of the face of the subject person and authenticity determination that is based on the second feature value, calculates a score that indicates a possibility of being authentic every time authenticity determination is performed, and executes conclusive authenticity determination based on scores calculated in the respective instances of authenticity determination.

4. A spoofing detection method comprising:

obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;

extracting information specifying a face portion of the subject person as first face information, from the first image frame, and extracting information specifying a face portion of the subject person as second face information, from the second image frame;

obtaining a luminance value of the face portion in the first image frame using the first face information, obtaining a luminance value of the face portion in the second image frame using the second face information, and calculating, based on the obtained luminance values, a feature value that reflects a three-dimensional shape of the face of the subject person, and that is independent of colors of a surface of the face of the subject person;

determining authenticity of the subject person captured by the image capture apparatus, based on the feature value;

extracting a portion that includes a bright point formed by reflection in an iris region of an eye of the subject person, from the first image frame based on the first face information, further extracts a portion corresponding to the portion that includes the bright point, from the second image frame based on the second face information, and calculates, based on the two extracted portions, a second feature value; and determining authenticity of the subject person captured by the image capture apparatus, based on the second feature value and the feature value that reflects the three-dimensional shape of the face of the subject person, and that is independent of the colors of the surface of the face of the subject person.

5. The spoofing detection method according to claim 4, further comprising:

setting a light-emitting period of the light-emitting apparatus and a shooting timing of the image capture apparatus.

6. The spoofing detection method according to claim 4, wherein, authenticity determination that is based on the feature value that reflects the three-dimensional shape of the face of the subject person, and that is independent of the colors of the surface of the face of the subject person and authenticity determination that is based on the second feature value are separately executed, a score that indicates a possibility of being authentic is calculated every time authenticity determination is performed, and conclusive authenticity determination is executed based on scores calculated in the respective instances of authenticity determination.

7. A non-transitory computer-readable recording medium that includes a program recorded thereon, the program including instructions that cause a computer to carry out:

obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;

extracting information specifying a face portion of the subject person as first face information, from the first image frame, and extracting information specifying a face portion of the subject person as second face information, from the second image frame;

obtaining a luminance value of the face portion in the first image frame using the first face information, obtaining a luminance value of the face portion in the second image frame using the second face information, and calculating, based on the obtained luminance values, a feature value that reflects a three-dimensional shape of the face of the subject person, and that is independent of colors of a surface of the face of the subject person;

determining authenticity of the subject person captured by the image capture apparatus, based on the feature value;

extracting a portion that includes a bright point formed by reflection in an iris region of an eye of the subject person, from the first image frame based on the first face information, further extracts a portion corresponding to the portion that includes the bright point, from the second image frame based on the second face information, and calculates, based on the two extracted portions, a second feature value; and determining authenticity of the subject person captured by the image capture apparatus, based on the second feature value and the feature value that reflects the three-dimensional shape of the face of the subject person, and that is independent of the colors of the surface of the face of the subject person.

8. The non-transitory computer-readable recording medium according to claim 7, the program further including an instruction that causes a computer to carry out:

setting a light-emitting period of the light-emitting apparatus and a shooting timing of the image capture apparatus.

9. The non-transitory computer-readable recording medium according to claim 7, wherein, authenticity determination that is based on the feature value that reflects the three-dimensional shape of the face of the subject person, and that is independent of the colors of the surface of the face of the subject person and authenticity determination that is based on the second feature value are separately executed, a score that indicates a possibility of being authentic is calculated every time authenticity determination is performed, and conclusive authenticity determination is executed based on scores calculated in the respective instances of authenticity determination.

* * * * *